United States Patent
Bayar et al.

(10) Patent No.: US 7,995,483 B1
(45) Date of Patent: Aug. 9, 2011

(54) SIMULTANEOUSLY TESTING CONNECTIVITY TO MULTIPLE REMOTE MAINTENANCE ENDPOINTS OF THE SAME MAINTENANCE ASSOCIATION

(75) Inventors: Roopa Bayar, San Jose, CA (US); Pankaj Shukla, San Jose, CA (US); Apurva Mehta, Cupertino, CA (US); Sunesh Rustagi, Cupertino, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 163 days.

(21) Appl. No.: 12/396,138

(22) Filed: Mar. 2, 2009

Related U.S. Application Data

(60) Provisional application No. 61/145,878, filed on Jan. 20, 2009.

(51) Int. Cl.
*H04J 1/16* (2006.01)
(52) U.S. Cl. ..................................... 370/241.1; 370/245
(58) Field of Classification Search .................. 370/241, 370/241.1, 242, 245, 252, 229, 230, 235
See application file for complete search history.

(56) References Cited

U.S. PATENT DOCUMENTS

| | | | |
|---|---|---|---|
| 2006/0198315 A1* | 9/2006 | Sasagawa et al. | 370/244 |
| 2008/0016402 A1* | 1/2008 | Harel et al. | 714/43 |
| 2009/0180399 A1* | 7/2009 | Li et al. | 370/254 |

OTHER PUBLICATIONS

"Ethernet Operations, Administration, and Maintenance," White Paper, Cisco Systems, Inc., Copyright 1992-2007, 15 pgs.

* cited by examiner

*Primary Examiner* — Huy D Vu
*Assistant Examiner* — Dady Chery
(74) *Attorney, Agent, or Firm* — Shumaker & Sieffert, P.A.

(57) ABSTRACT

In general, techniques are described for simultaneously testing connectivity to same or different remote maintenance endpoints of the same maintenance association. Specifically, a network device may include a control unit that simultaneously executes both a first and a second maintenance session. The control unit maintains first and second session identifiers that uniquely identifies the first and second maintenance sessions. The control unit receives via the first maintenance session input that specifies parameters for a maintenance message and generates the maintenance message in accordance with the parameters such that the maintenance message includes the first session identifier. The network device also includes an interface card that forwards the maintenance message to another network device in order to determine connectivity between these two network devices. By generating the maintenance message to include the first session identifier, the control unit may upon receiving a response to the maintenance message resolve to which of the maintenance session the response corresponds.

29 Claims, 6 Drawing Sheets

SIMULTANEOUSLY TESTING CONNECTIVITY TO MULTIPLE REMOTE MAINTENANCE ENDPOINTS OF THE SAME MAINTENANCE ASSOCIATION

This application claims the benefit of U.S. Provisional Application No. 61/145,878, filed Jan. 20, 2009, the entire content of which is incorporated herein by reference.

TECHNICAL FIELD

The invention relates to computer networks and, more particularly, to maintenance of computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission. Computer networks may divide data into other types of data units, such as cells or frames.

The computing devices may be interconnected by one or more links. The term "link" is often used to refer to the connection between two devices on a network and may include a physical medium, such as a copper wire, a coaxial cable, or any of a host of different fiber optic lines, or a wireless connection. One or more devices of the network and/or one or more links of the network may fail due to any of a number of reasons. When a device or link of the network fails, the result is a loss of service to particular customers, which is generally undesirable. An administrator of the network would therefore like to limit the amount of time of the failure.

Operations, Administration and Maintenance (OAM) generally refers to processes, activities, tools, standards and other techniques that involve operating, administering and maintaining, e.g., troubleshooting, a computer network. One such OAM techniques, such as Connectivity Fault Management (CFM) as described in the IEEE 802.1ag standard, may include a number of proactive and diagnostic fault localization procedures. For example, a network device operating in accordance with CFM may proactively transmit connectivity check (CC) messages at a predetermined rate to other devices within the same maintenance association, i.e., a logical grouping of devices within the network configured to verify the integrity of a single service instance. A service instance may, for example, represent a portion, e.g., network devices, of a provider network that a given customer can access to query a status of services delivered for that customer. The CC messages provide connectivity verification to the other network devices within the maintenance association. The other network devices in the maintenance association may create and maintain a connectivity database of network devices from which periodic CC messages are expected to be received. The network devices may, after establishing connectivity with the other network devices, monitor receipt of CC messages. If a CC message is not received from one of the network devices identified in the connectivity database within a configured time, the network device may identify a failure of the device from which the CC message was expected to be received. This failure is commonly referred to as a "connectivity failure."

A network device operating in accordance with CFM may also include a number of reactive procedures for identifying fault locations, such as loopback and link trace messages. A loopback message is transmitted from a first network device to a second network device. If the second network device is in front of the fault, the second network device responds with a loopback reply. If the second network device is behind the fault, the second network device may not receive the loopback message and may therefore fail to responds with a loopback reply. The precise location of the fault within the maintenance association may be identified based on whether the first device receives the loopback reply. Other OAM standards, such as those defined in ITU-T Y.1731, IEEE 802.1ab, IEEE 802.1ah and ITU G.8031, may include similar proactive and diagnostic procedures.

SUMMARY

In general, techniques are described that allow different user interface sessions on a local maintenance endpoint to simultaneously test the connectivity of different remote maintenance endpoints belonging to the same maintenance association. A network device, such as a router or a network bridge, operating as a local maintenance endpoint (MEP) for the maintenance association includes a modified loopback protocol that extends or otherwise adds information to loopback messages sent to the remote MEPs, where the modified messages each identify the particular internal user interface software sessions of the local MEP that initiated or generated each of the loopback message. The network device operating as the local MEP may add this information to each outbound message via an optional Type-Length-Value (TLV) field used within messages that conform to a maintenance communications protocols, such as the CFM protocols described in an IEEE 802.1ag standard.

Upon receiving one of the modified loopback messages, a responding network device operating as a remote MEP may copy the TLV field specifying the session identifier (ID) to a loopback response message so as to include this additional information. As a result, when two or more user interface maintenance sessions are executing simultaneously on the same network device operating as the local MEP, the network device may internally multiplex incoming response messages from the remote MEPs so as to resolve the responses to the appropriate internal user interface using the session identifier specified in the TLV field of each loopback response. Accordingly, the techniques enable a single network device to operate as a local MEP and execute multiple maintenance sessions to simultaneously test the connectivity of same or different remote MEPs belonging to the same maintenance association.

In operation, the network device operating as the local MEP may maintain a distinct session ID for each of a plurality of user interface maintenance sessions provided by the user interface executing within the network device. Each session ID may uniquely identify a corresponding one of the plurality of maintenance sessions. The network device may maintain these session IDs within a session table or some other data structure. The network device may implement one or more of the suite of CFM protocols, such as one or more of a Continuity Check Protocol (CCP) and a LoopBack Protocol (LBP). Typically, the network device implements both CCP and LBP, for example, in a modified form that conforms to the techniques described herein.

Typically, an administrator or other user may first configure the network device to operate a Maintenance EndPoint (MEP) by enrolling the network device within a Maintenance Association (MA) defined within the network. The configuration data entered by the administrator may define a list of other endpoints, e.g., MEPs, that belong to the same MA as the MEP of the network device. The network device may then establish connectivity with each of the other MEPs that belong to the same MA as the MEP of the network device. After establishing this connectivity, the network device may generate and forward Continuity Check Messages (CCMs) in accordance with CCP to each of the expected MEPs included within the list.

In some embodiments, the CCM comprises a multicast message and the network device may multicast this CCM to each of the expected MEPs included within the list or MA. In other words, the MEPs of a given MA may join a multicast group in accordance with a multicast protocol, such as an Internet Group Management Protocol (IGMP). Each of the MEPs may then generate a CCM that identifies the multicast group, e.g., includes a group address, and forwards the CCM to the multicast group, whereupon each of the other MEPs of the group receive the CCM.

The network device may also receive CCMs from each of the expected remote MEPs of the list and generate another list of currently connected MEPs based on receipt of CCMs from these expected MEPs. In order to generate this list, the network device may monitor loss of CCM or, better stated CCM packets. If a MEP does not receive a CCM packet before a configurable threshold or within a configurable amount of time, the network device may remove the MEP from the list of currently connected MEPs. The network device may compare the list of expected MEPs to the list of currently connected MEPs to determine a connectivity fault within the network. If one or more of the expected MEPs are not included within the list of currently connected MEPs, the network device may determine a connectivity fault has occurred and present a warning to the administrator indicating this fault.

While described herein as maintaining lists, the network device may alternatively maintain a configurable threshold value for each of the other MEPs by which to determine a connectivity fault and present the warning to the administrator upon detecting such a fault. In other words, the techniques should not be limited to the exemplary embodiments described herein.

The administrator may then interact with the network device via a user interface that presents one or more of the plurality of maintenance sessions (e.g., using a remote access protocol such as Telnet or SSH) in order to specify input defining parameters by which to generate a maintenance message, such as a LoopBack Message (LBM). Assuming a first one of the plurality of maintenance sessions of the user interface received the parameters from the administrator, the network device may associate the parameters to a first one of the session IDs associated with the first maintenance session. The network device may then generate a modified maintenance message, e.g., LBM, to include the first session ID as a TLV field within the LBM. In this way, the modified LBM uniquely identifies the particular user interface session that initiated the maintenance process, and forward this LBM to a target remote MEP specified by the user so as to determine connectivity between these two network devices, and thereby attempt to resolve the location of the connectivity fault.

The network device operating as the local MEP may then, assuming connectivity between the network devices, receive a LoopBack Response message (LBR) from the other network device. The other network device operating as remote MEPs may generate the LBR by swapping the source and destination addresses of the LBM and updating an opcode of the LBM to indicate that this message is an LBR and not an LBM. The remote MEPs may not perform any other updates or operations to generate the LBR from the LBM. The remote MEPs may then forward this altered LBM back to the network device as the LBR. The network device may then parse the LBR to determine the first session ID stored to the LBR and use this parsed session ID to resolve to which of the plurality of maintenance sessions executing on the local MEP the LBR corresponds. Without this session ID, the network device would otherwise not be able to execute multiple maintenance sessions to simultaneously send LBMs to a remote MEP belonging to the same maintenance association as responses from remote MEP of the same maintenance association would otherwise not be resolved to different maintenance sessions. By including this session ID within the maintenance messages, the network device may, however, enable simultaneous execution of multiple maintenance sessions and thereby improve network maintenance and troubleshooting.

In one embodiment, a method comprises simultaneously executing, with a first network device, a first maintenance session and a second maintenance session different from the first maintenance session for a same maintenance association, wherein the maintenance association comprises a logical grouping of at least the first network device and a second network device that are established to verify the integrity of a single service instance and maintaining a first session identifier that uniquely identifies the first maintenance session within the first network device and a second session identifier that uniquely identifies the second maintenance session within the first network device. The method further comprises generating, with the first network device, an outgoing maintenance message such that the outgoing maintenance message includes a session identifier field specifying either the first or the second session identifier and transmitting, with the first network device, the outgoing maintenance message to a second network device included within the maintenance association, wherein the session identifier field is transparent to the second network device. The method also comprises receiving, with the first network device, a response maintenance message from the second network device in response to the outgoing maintenance message, wherein the response maintenance message transparently includes the same session identifier field specifying either the first or the second session identifier, parsing, with the first network device, the response maintenance message to determine whether the session identifier field stores either the first or the second session identifier, and forwarding, with the first network device, the response maintenance message to either the first or the second maintenance session based on the determination.

In another embodiment, a network device comprises a control unit that simultaneously executes a first maintenance session and a second maintenance session different from the first maintenance session for a same maintenance association, wherein the maintenance association comprises a logical grouping of at least the network device and another network device that are established to verify the integrity of a single service instance, maintains a first session identifier that uniquely identifies the first maintenance session within the first network device and a second session identifier that uniquely identifies the second maintenance session within the first network device and generates an outgoing maintenance message such that the outgoing maintenance message includes a session identifier field specifying either the first or the second session identifier. The network device also comprises at least one interface card that transmits the outgoing maintenance message to the other network device included within the maintenance association, wherein the session identifier field is transparent to the other network device and receives a response maintenance message from the second network device in response to the outgoing maintenance message, wherein the response maintenance message transparently includes the same session identifier field specifying either the first or the second session identifier. The control unit further parses the response maintenance message to determine whether the session identifier field stores either the first or the second session identifier and forwards the response maintenance message to either the first or the second maintenance session based on the determination.

In another embodiment, a network system comprises a first network that includes a first network device and a second network that includes a second network device. The first network device and the second network device logically belong to a maintenance association that enables the first network device to troubleshoot connectivity between the first network device and the second network device that belong to the same maintenance association. The first network device includes a first control unit that simultaneously executes a first maintenance session and a second maintenance session different from the first maintenance session for the same maintenance association, maintains a first session identifier that uniquely identifies the first maintenance session within the first network device and a second session identifier that uniquely identifies the second maintenance session within the first network device and generates an outgoing maintenance message such that the outgoing maintenance message includes a session identifier field specifying either the first or the second session identifier. The first network device also includes a first interface card that transmits the outgoing maintenance message to the second network device included within the maintenance association, wherein the session identifier field is transparent to the other network device. The second network device includes a second interface card that receives the outgoing maintenance message from the first network device, wherein the outgoing message includes a destination address identifying the second network device and a source address identifying the first network device and a second control unit that generates a response maintenance message to the outgoing maintenance message by swapping the destination address with the source address and changing an opcode of the response message to indicate a type of the message as a response message without further modifying the outgoing maintenance message. The second interface card forwards the response maintenance message to the first network device. The first interface card receives the response maintenance message from the second network device, wherein the response maintenance message transparently includes the same session identifier field specifying either the first or the second session identifier. The first control unit parses the response maintenance message to determine whether the session identifier field stores either the first or the second session identifier and forwards the response maintenance message to either the first or the second maintenance session based on the determination.

In another embodiment, a computer-readable medium comprising instructions that cause a programmable processor to (1) simultaneously execute, with a first network device, a first maintenance session and a second maintenance session different from the first maintenance session for a same maintenance association, wherein the maintenance association comprises a logical grouping of at least the first network device and a second network device that are established to verify the integrity of a single service instance, (2) maintain a first session identifier that uniquely identifies the first maintenance session within the first network device and a second session identifier that uniquely identifies the second maintenance session within the first network device, (3) generate, with the first network device, an outgoing maintenance message such that the outgoing maintenance message includes a session identifier field specifying either the first or the second session identifier, (4) transmit, with the first network device, the outgoing maintenance message to a second network device included within the maintenance association, wherein the session identifier field is transparent to the second network device, (5) receive, with the first network device, a response maintenance message from the second network device in response to the outgoing maintenance message, wherein the response maintenance message transparently includes the same session identifier field specifying either the first or the second session identifier, (6) parse, with the first network device, the response maintenance message to determine whether the session identifier field stores either the first or the second session identifier and (7) forward, with the first network device, the response maintenance message to either the first or the second maintenance session based on the determination.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
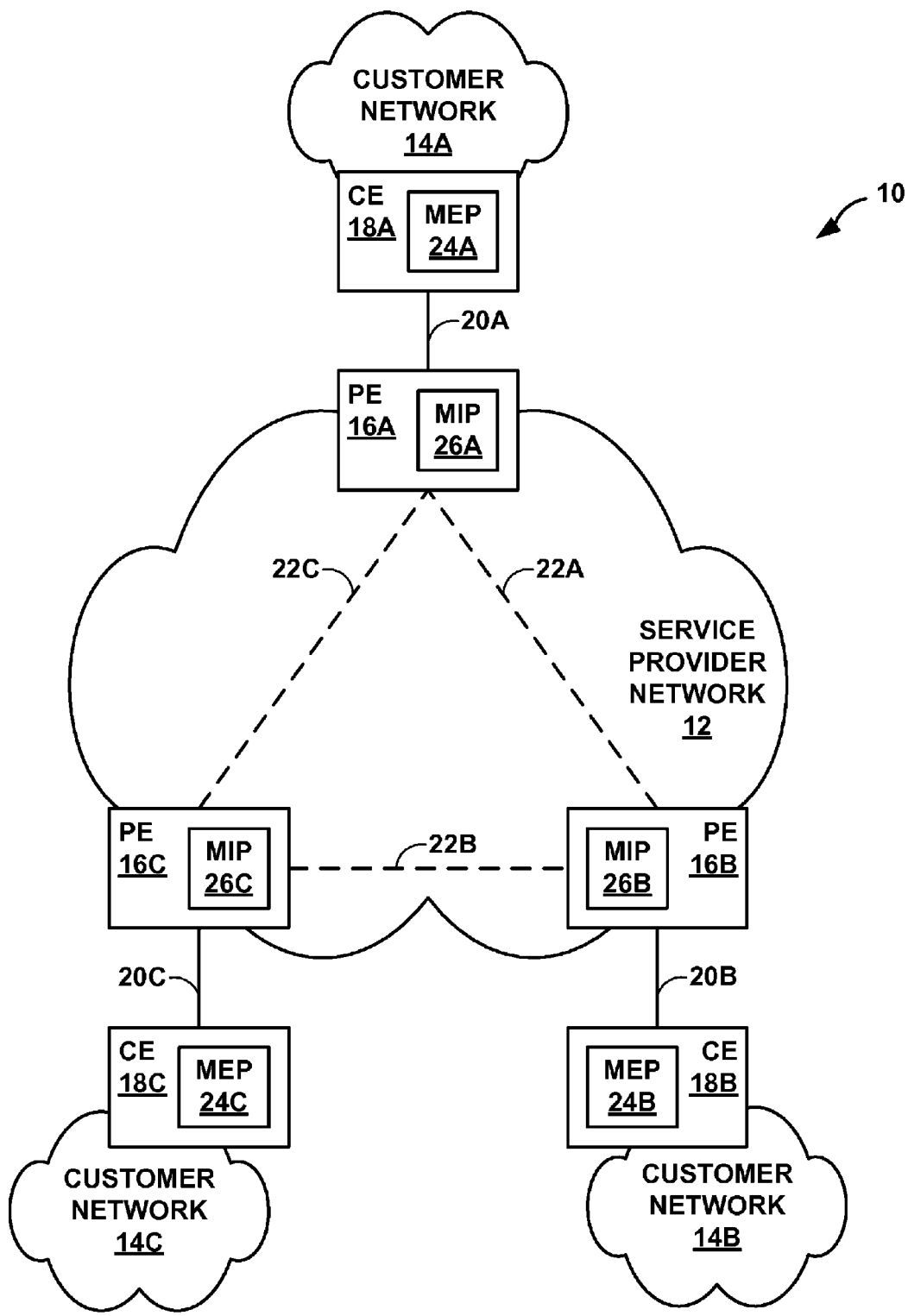
FIG. 1 is a block diagram illustrating a network system in which one or more network devices perform the techniques described in this disclosure to simultaneously execute two or more maintenance sessions.

FIG. 1 is a block diagram illustrating a network system 10 in which one or more network devices perform the techniques described in this disclosure to simultaneously testing connectivity to multiple remote maintenance endpoints of the same maintenance association. "Simultaneously," as used herein, means concurrently, i.e., at the same time.

As shown in FIG. 1, network system 10 includes a network 12 and customer networks 14A-14C ("customer networks 14"). Network 12 may represent a public network that is owned and operated by a service provider to interconnect a plurality of edge networks, such as customer networks 14. As a result, network 12 may be referred to herein as a Service Provider (SP) network or, alternatively, as a "core network" considering that network 14 acts as a core to interconnects edge networks, such as customer networks 14. Exemplary service providers include Verizon Communications Inc. or American Telephone & Telegraph (AT&T) Company.

These service providers may lease portions of network 12 or provide services offering interconnection through network 12 to customer networks 14, which may lease the portions or purchase the services provided by network 12. For example, network 12 may offer a Virtual Private Large Area Network (LAN) Service (VPLS) to virtually interconnect various layer 2 or data link layer networks. Reference to layers followed by a numeral may refer to a particular layer of the Open Systems Interconnection (OSI) model. VPLS may transparently interconnect these layer 2 networks, e.g., customer networks 14, to one another via service provider network 12. Network 12 may provide VPLS by transparently emulating a direct connection between these various customer networks 14 such that, from the perspective of customer networks 14, each of customer networks 14 appears to directly connect to one another.

Customer networks 14 may each represent a network owned and operated by a large entity, such as a university, corporation, business, or other facility or enterprise. In some instances, a single large entity may own and operate two or more of customer networks 14. The entity may then contract with service provider network 12 to purchase a service offered by service provider network 12, such as VPLS, in order to transparently interconnect these networks 14 in the manner described above.

Each of customer networks 14 may operate according to a wide variety of network protocols, such as any of the 802.3X family of network protocols related to the Ethernet protocol, any of the 802.1X family of wireless networking protocols, an Internet Protocol (IP) protocol, an Asynchronous Transfer Mode (ATM) protocol, and a Transmission Control Protocol (TCP). Moreover, one or more of customer networks 16 may comprise a Virtual Private Network (VPN), a Large Area Network (LAN), or a Wide Area Network (WAN). Although not shown in FIG. 1 for ease of illustration purposes, each of customer networks 16 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection.

Network 12 may include a plurality of Provider Edge (PE) routers 16A-16C ("PEs 16") that reside at an edge of service provider network 12, hence the name "provider edge" routers. While discussed herein with respect to a particular network device, i.e., a router, PEs 16 may each represent any network device that interfaces with a network, such as one of customer networks 14, to route, switch or otherwise forward network traffic directed to or originating from the network. For example, PEs 16 may each represent, in certain instances, one or more of a router, a switch, a hub, a bridge device (e.g., an Ethernet bridge), and the like.

Each of customer networks 14 may also include a respective one of a plurality of Customer Edge (CE) routers 18A-18C ("CEs 18") that reside at an edge of the corresponding one of customer networks 14, hence the name "customer edge" routers. Like PE routers 16, CE routers 18, while discussed herein with respect to a particular network device, i.e., a router, may each represent any network device that interfaces with a network, such as service provider network 12, to route, switch or otherwise forward network traffic directed to or originating from the network. For example, CEs 18 may each represent, in certain instances, one or more of a router, a switch, a hub, a bridge device (e.g., an Ethernet bridge), and the like.

PEs 16 may couple to a respective one of CEs 18 via network links 20A-20C ("links 20"). PEs 16 may provide one or more services, such as the above described VPLS, to transparently interconnect CEs 18 to one another. To continue the above example, the large entity may own and operate each of customer networks 14 and purchase from service provider network 12 a VPLS or other service, such as a Virtual Private Network (VPN) service, to transparently interconnect each of these customer networks 14 to one another. In this instance, PE 16A may emulate a direct connection in accordance with the purchased service to both of customer networks 14B, 14C such that CE 18A may operate as if it directly connects to both CE 18B and CE 18C. Likewise, PE 16B may emulate a direct connection in accordance with the purchased service to both of customer networks 14A, 14C such that CE 18B may operate as if it directly connects to both CE 18A and CE 18C. Additionally, PE 16C may emulate a direct connection in accordance with the purchased service to both of customer networks 14A, 14B such that CE 18C may operate as if it directly connects to both CE 18A and CE 18B.

This form of interconnection is referred to as "full mesh" in that each of a set of customer networks 14 interconnect with every other one of the set of customer networks 14. The full mesh form of interconnection is illustrated in FIG. 1 as three bi-directional virtual links 22A-22C ("virtual links 22") that couple PEs 16 to one another. Virtual links 22 are illustrated in FIG. 1 as dashed lines to reflect that these links 22 may not directly couple PEs 16 to one another, but may represent one or more physical links and intermediate network devices that form each of virtual links 22. While assumed for ease of illustration purposes to be configured in this full mess manner, customer networks 14 may interconnect with one another via any other form of interconnection, and virtual links 22 may be bi-directional or unidirectional to suit any particular form of interconnection.

An administrator of service provider network 12 may configure the purchased service to establish virtual links 22, and once established, PEs 16 may begin emulating the direct connection between CEs 18 via virtual links 22. CEs 18 may receive network traffic from their respective customer networks 14 and forward this network traffic via respective physical links 20 to corresponding PEs 16. PEs 16 may then transparently forward the network traffic through service provider network 12 via virtual links 22 in accordance with the purchased service. PEs 16 may then deliver the network traffic to the other ones of CEs 18 via physical links 20, whereupon CEs 18 may forward the traffic to their respective customer networks 14. In this manner, a large entity may purchase a service from service provider network 12 to interconnect disparate and often geographically separate customer networks 14.

To facilitate maintenance of the interconnection of customer networks 14, one or more of PEs 16 and/or one or more of CEs 18 may implement Operations, Administration, and Maintenance (OAM) techniques, such as Connectivity Fault Management (CFM) as described in the IEEE 802.1ag standard. CFM may generally enable discovery and verification of a path, through network devices and networks, taken by data units, e.g., frames or packets, addressed to and from specified network users, e.g., customer networks 14. Typically, CFM is directed to fault management within layer 2 networks, such as Ethernet networks otherwise referred to as Large Area Networks (LANs), and layer 2 services, such as VPLS. While described herein with respect to layer 2 networks and services and the layer 2-centric CFM, the techniques may be employed to facilitate simultaneous execution of sessions for maintenance and operation management for networks and services provided with respect to other layers of the OSI model.

CFM generally provides a set of protocols by which to perform fault management. One protocol of the CFM set of protocols may involve a periodic transmission of messages to determine, verify or otherwise check continuity between two endpoints and may be referred to as a "continuity check protocol." Another protocol of the CFM set of protocols may involve a user or operator driven protocol by which targeted messages may be sent to specific endpoints requesting a response. The targeted or specific endpoint, may upon receiving the request message, issue a response to the message, such that the request and response loops from the originator of the specific endpoint and back to the originator. This second protocol of the CFM set of protocols may be referred to, for this reason, as a "loopback protocol." More information regarding CFM in general and the CFM set of protocols, including the continuity check protocol and the loopback protocol, can be found in an Institute of Electrical and Electronics Engineers (IEEE) draft standard, titled "Virtual Bridged Local Area Networks—Amendment 5: Connectivity Fault Management," by the LAN MAN Standards Committee, dated Jun. 18, 2007, herein incorporated by reference in its entirety.

In accordance with CFM, one or more users or administrators of customer networks 14 may establish various abstractions useful for managing maintenance operations. For example, the administrators may establish a Maintenance Domain (MD) specifying those of CEs 18 that support CFM maintenance operations. In other words, the MD specifies the network or part of the network for which faults in connectivity may be managed. The administrator may, in establishing or defining the MD, assign a maintenance domain name to the MD, which represents a MD identifier that uniquely identifies a particular MD. It is assumed for purposes of illustration that the MD includes not only CEs 18 but also additional CEs not shown in FIG. 1.

The administrators may further sub-divide the MD into one or more Maintenance Associations (MA). An MA may is a logical grouping that generally comprises a set of those CEs included within the MD and established to verify the integrity of a single service instance. A service instance may, for example, represent a portion, e.g., network devices, of a provider network that a given customer can access to query a status of services delivered for that customer. It is assumed for purposes of illustration that the administrators configured an MA to include each of CEs 18. To establish the MA, the administrators may configure a Maintenance association End Point (MEP) 24A-24C ("MEPs 24") within each one of CEs 18. While shown as including a single MEP 24, CEs 18 may include a plurality of MEPs 24, one for each of a plurality of service instances. MEPs 24 may each represent an actively managed CFM entity that generates and receives CMF Payload Data Units (PDUs) and tracks any responses. In other words, each of MEPs 24 represents an endpoint of the same MA.

The administrators may, when establishing the MA, define an MA IDentifier (MAID) and an MD level. The MA identifier may comprise an identifier that uniquely identifies the MA within the MD. The MA identifier may comprise two parts, the MD name assigned to the MD in which the MA resides and a MA name. The MD level may comprise an integer or other value identifying an abstract layer or portion of the MD to which the MA is associated. In other words, the MD level may segment the MD into levels at which one or more MAs may reside. The administrators may then, when configuring MEPs 24, associate MEPs 24 to the MA by configuring each of MEPs 24 with the same MA identifier and the same MD level. In this respect, the MA comprises the set of MEPs 24, each configured within the same MAID and MD level, established to verify the integrity of a single service instance.

Once configured in this manner, MEPs 24 may each detect both connectivity failures and unintended connectivity between service instances. Each of MEPs 24 may periodically transmit a Connectivity Check Message (CCM) announcing the identity and configured MA level of the transmitting one of MEPs 24. MEPs 24 may multicast this message to each of MEPs 24 included within the same MA level. Each of MEPs 24 may track the CCMs received from other MEPs 24 to determine connectivity faults and unintentional connectivity. For example, MEPs 24 may detect a connectivity fault by determining, based on received CCMs, a list of connected MEPs and comparing this list to a list of those MEPs within the same MA level. If the list of connected MEPs includes less MEPs than those expected or configured within each of MEPs 24, then MEPs 24 may determine that one or more of MEPs 24 lack a desired connectivity.

In other words, MEPs 24 may each be configured with one or more MEPs 24 with which it expects to exchange, e.g., transmit and receive, CCM messages. MEPs 24 may then proceed to exchange CCM messages according to how each of MEPs 24 is configured. MEPs 24 may generate a list or otherwise track CCM messages after each exchange to determine those of MEPs 24 to which it is currently connected. If one of MEPs 24 did not receive an expected CCM message, for example, that one of MEPs 24 may generate a list lacking one of MEPs 24. Upon comparing this connectivity list to the expected list, this one of MEPs 24 may determine that one of MEPs 24 is not currently connected. In this manner, MEPs 24 may periodically determine whether each of MEPs 24 of the same MA are currently interconnected with one another, and thereby periodically evaluate connectivity.

As another example, MEPs 24 may detect a connectivity fault based on a loss of received CCMs. In some instances, each of MEPs 24 may maintain a threshold by which to determine whether a connectivity fault occurs. Each of MEPs 24 may maintain a single threshold or one threshold for each of the other MEPs 24. The threshold may be configurable by an administrator or may be dynamically set by the MEPs 24 based on observed network characteristics, such as a determined available bandwidth. In any case, MEPs 24 may monitor receipt of CCMs from each of the other ones of MEPs 24. MEPs 24 may determine a length or interval of time between receipt of successive CCMs from the same one of MEPs 24 and compare this interval to the threshold, if only one threshold is maintained, or the corresponding one of the plurality of thresholds, in instances where the MEP maintains a threshold for each MEP. If the interval exceeds the threshold, the one of MEPs 24 determines that one of MEPs 24 lack a desired connectivity. If the interval does not exceed the threshold, the one of MEPs 24 determines that the other one of MEPs 24 is connected.

In some instances, each of MEPs 24 may implement the plurality of thresholds as a timer that is continually reset upon receipt of a CCM from a respective one of MEPs 24. In these instances, each of MEPs 24 may reset the timer to the threshold value upon receipt of a CCM from a corresponding one of MEPs 24. The threshold value may be configurable by an administrator or dynamically determined based on a determined network characteristic, e.g., available bandwidth. If the timer reaches zero, the MEP may determined that a corresponding one of MEPs 24 lacks the desired connectivity. While a number of examples are described herein by which to determine a connectivity fault, the techniques of this disclosure should not be limited to any one of the above examples.

Instead, the techniques described herein may be implemented by a network device to detect a fault in any manner.

MEPs 24 may execute the continuity check protocol to automatically, e.g., without any administrator or other user oversight after the initial configuration, exchange these CCM messages according to a configured or, in some instances, set period. MEPs 24 may, in other words, implement the continuity check protocol to perform fault detection. Upon detecting a lack of connectivity or connectivity fault, the administrator or other user, such as an Internet Technology (IT) specialist, may troubleshoot the fault using the above described loopback protocol.

Typically, the administrator performs this troubleshooting to verify and, once verified, isolate the fault, e.g., resolve where in the network the fault exists or occurred. To verify the fault, the administrator may interact with one of CEs 18 via a user interface (such as via Telnet or SSH) to cause the corresponding one of MEPs 24 to issue or transmit a unicast Loopback Message (LBM). The administrator may direct the one of MEPs 24 to issue the LBM to one of MEPs 24 or Maintenance domain Intermediate Points (MIPs) 26A-26C ("MIPs 26").

An administrator may configure, also in accordance with CFM, each of MIPs 26 within respective PEs 16. Each of MIPs 26 may represent a passive, rather than active, maintenance access point by which to query a status of and perform other maintenance operations with respect to PEs 16. MIPs 26 may, for example, receive LBMs and respond to LBM with a Loopback response or Reply message denoted by the acronym "LBR," but may not generate a LBM. Each of MIPs 26 may be configured by the administrator such that each of MIPs 26 is associated with a single MD and also with a single MD level. In this respect, the administrator may configure each of MIPs 26 to be grouped with particular MEPs, such as MEPs 24, forming a particular MA, such as the above assumed MA formed by MEPs 24. MIPs of different MA may then only respond to messages from MEPs that belong to the same MA. It is assumed herein for purposes of illustration that each of MIPs 26 is configured within the same MA as MEPs 24.

To interact with one of MEPs 24 of a corresponding one of CEs 18, the administrator initiates a maintenance session by which to configure the LBM. The one of CEs 18 with which the administrator interacts is referred to as the local MEP, and the local MEP may execute this maintenance session by presenting a user interface, such as a Graphical User Interface, and/or a Command Line Interface (CLI), by which the administrator may interact with the corresponding one of MEPs 24. In other words, the maintenance session may comprise a software process executing on a processor or other execution or control unit. An operating system executing on the processor may assign this session a processes identifier (ID) or other handle by which the operating system may identify the process associated with the maintenance session for scheduling and other execution purposes. In this way, the maintenance session represents the software process and its current state as executing within the operating environment provided by the local MEP.

Via this maintenance session, the administrator may invoke the proper maintenance protocol (e.g., the CFM loopback protocol) to configure and generate LBMs, which the local MEP issues to other MEPs 24 or MIPs 26. For example, MEP 24B may detect it cannot connect to MEP 24A or in other words a connectivity fault with respect to MEP 24A in accordance with the continuity check protocol as described above. That is, MEP 24B may not receive a CCM from MEP 24A within a period of time and determine this connectivity fault.

MEP 24B may issue an alert, warning or error indicating this fault to an administrator of customer network 14B. MEP 24B may present this alert, warning or error via a user interface, email, text message, website or other similar means of communication. The administrator may then log into CE 18B and initiate a maintenance session to interact with MEP 24B and further troubleshoot the connectivity to MEP 24A using the modified CFM loopback protocol as described herein.

In this example, the administrator may, via the maintenance session, configure one or more LBMs to resolve where in the network the fault exists, as the connectivity fault may, in the example network system 10 of FIG. 1, occur in link 20B, PE 16B, virtual link 22A, PE 16A, link 20A, and CE 18A. The administrator may configure by way of the maintenance session a LBM and cause MEP 24B to generate and forward this configured LBM to MIP 26B of PE 16B to verify both link 20B and PE 16B. Upon receiving an LBR back from PE 16B, the administrator may determine that both link 20B and PE 16B are not the source of the fault. The administrator may, in this manner, continue to configure LBMs and cause MEP 24B to generate and forward these LBMs to various MEPs 24 and MIPs 26 in order to resolve where in the network the fault exists.

In accordance with the techniques set forth in this disclosure, one or more of CEs 24 provide an operating environment for simultaneous execution of multiple maintenance sessions rather than only a single maintenance session. To support execution of both the first and second maintenance sessions, any one of CEs 24 operating as a local MEP may each maintain a first session identifier (e.g., process identifier) that uniquely identifies the first maintenance session and a second session identifier (e.g., a second process identifier) that uniquely identifies the second maintenance session. This session identifier may comprise the above described process ID or other handle maintained by the control unit included within each of CEs 18. While described herein with respect to a process ID, other handles or identifiers may be used so long as each handle or identifier uniquely identifies each of the first and second or plurality of maintenance sessions.

The administrator may interact with the first maintenance session (e.g., via a first Telnet or SSH connection) to input a maintenance command that specifies at least one parameter by which to invoke a maintenance protocol to construct a maintenance message, such as an LBM. The parameters provided by the administrator may specify an identifier assigned to a particular one of MEPs 24 or MIPs 26 that is the destination of the LBM, a particular MD level, an MA identifier, or any other parameters related to configuring a maintenance message, such as an LBM. In this respect, the first maintenance session may receive this maintenance command specifying parameters by which to generate the maintenance message and, in response to this command, invoke the maintenance protocol to cause the local MEP to generate an outbound maintenance message in accordance with the parameters of the maintenance command.

When generating the maintenance message, the local MEP transparently embeds the first session identifier within the maintenance message in order to indicate that the first maintenance session originally invoked the maintenance protocol and caused the local MEP to generate the maintenance message. The local MEP may embed the first session identifier within the maintenance message as an optional and extensible Type-Length-Value (TLV) field. That is, assuming MEP 24B generates the maintenance message, e.g., LBM, MEP 24B may generate the LBM to include a TLV field that specifies a first type portion identifying the type of the extensible TLV field, a second length portion of the TLV field specifying the length of the TLV field in bytes, bits or other measures of data, and a third value portion of the TLV field, which in this instance, may specify the first session identifier. The first two portions enable the destination of the LBM to parse the TLV field appropriate and interpret the value portion of the TLV field.

The one of MEPs 24 operating as the local MEP may then forward the maintenance message to another one of MEPs 24 or MIPs 26 of a respective one of CEs 18 or PEs 16 as directed by the administrator in order to determine a connectivity status between the one of CEs 18 transmitting the maintenance message and the one of either CEs 18 or PEs 16 receiving the maintenance message. If connectivity exists, the targeted one of MEPs 24 or MIPs 26 of the receiving one of CEs 18 or PEs 16, respectively, responds with an LBR. Typically, the receiving one of CEs 18 or PEs 16 may generate the LBR by merely swapping the destination with the source address and forwarding the LBR back to the device, e.g., CE 18B, that originated the LBM. Thus, without its knowledge, remote MEP 24 of the receiving one of CEs 18 or PEs 16, has included in the LBR the information transparently embedded by the local MEP. Thus, the TLV field of the LBR carries the embedded first session identifier of the local MEP, and CE 18B may receive an LBR in response to the previously sent LBM that includes the TLV field specifying the first session identifier.

CE 18B may forward this LBR to MEP 24B which parses the TLV field to extract the first session identifier. Based on this first session identifier, MEP 24B forwards the LBR to the appropriate maintenance session, e.g., the first maintenance session in this case, executing with the user interface. Without this TLV field specifying the first maintenance session, MEP 24B and the maintenance protocols executed thereon may only support execution of a single maintenance session by CE 18B or only support interactions with a single maintenance session at a time. In other words, while multiple maintenance sessions may interact with MEP 24B, MEP 24B, without utilizing a TLV to specify a session identifier, may not uniquely resolve to which of the multiple maintenance sessions a given LBR corresponds. Thus, MEP 24B may otherwise be forced to forward each LBR to all of the various maintenance sessions, which may greatly confuse troubleshooting.

The techniques may therefore enable MEPs 24, by way of enabling a session identifier, to resolve to which of the plurality or multiple maintenance sessions each maintenance message corresponds. In this respect, an administrator may simultaneously initiate multiple maintenance sessions to interact with the same one of MEPs 24 to simultaneously or in parallel issue multiple LBMs, for example. The administrator may direct these simultaneous LBMs to different MEPs 24 and/or MIPs 26 included within different CEs 18 and/or PEs 16 or the same one of MEPs 24 or MIPs 26 included within the same one of CEs 18 or PEs 16. Regardless, as a result of the simultaneous nature of these messages, the techniques may promote timelier fault verification and identification, and thereby improve the performance of network system 10 by reducing time spent resolving connectivity faults.

Figure 2:
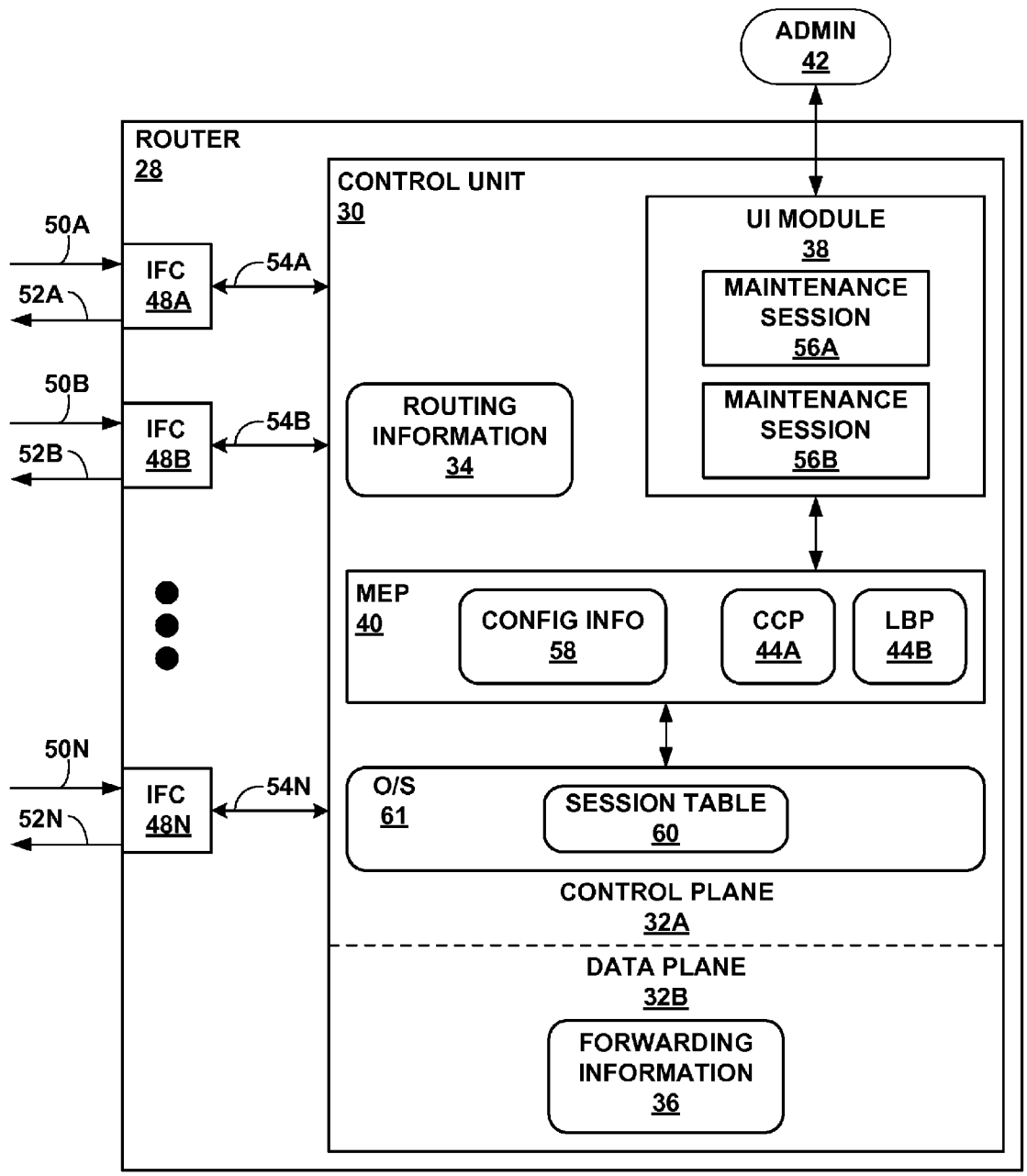
FIG. 2 is a block diagram illustrating an example embodiment of a router that implements the techniques described in this disclosure to simultaneously execute multiple maintenance sessions.

FIG. 2 is a block diagram illustrating an example embodiment of a router 28 that implements the techniques described in this disclosure to simultaneously execute multiple maintenance sessions. For purposes of illustration, router 28 may be described below within the context of exemplary network system 10 of FIG. 1 and may represent any one of CE routers 18. While described within this particular context, router 28 may also represent any one of PE routers 16. Moreover, while described with respect to a particular network device, e.g., a router, the techniques may be implemented by any network device including an Ethernet bridge, a switch, a hub or any other device by which an administrator may initiate multiple maintenance sessions. The techniques should therefore not be limited to the exemplary embodiments described herein.

As shown in FIG. 2, router 28 includes a control unit 30. Control unit 30 may comprise one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 30 may be divided into two logical or physical "planes" to include a first control or routing plane 32A and a second data or forwarding plane 32B. That is, control unit 30 may implement two separate functionalities, e.g., the routing and forwarding functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 32A of control unit 30 may execute the routing functionality of router 28. In this respect, control plane 32A may represent hardware and/or software of control unit 30 that implements routing protocols (not shown in FIG. 2) by which routing information 34 may be determined. Routing information 34 may include information defining a topology of a network, such as one of customer networks 14. Control plane 32A may resolve the topology defined by routing information 34 to select or determine one or more routes through a corresponding one of customer networks 14. Control plane 32A may then update data plane 32B with these routes, where data plane 32B maintains these routes as forwarding information 36. Forwarding or data plane 32B may represent hardware and/or software of control unit 30 that forwards network traffic in accordance with forwarding information 36.

Control plane 32A may further comprise a user interface module 38 and a maintenance endpoint (MEP) 40. User interface module 38 ("UI module 38") may represent a hardware and/or software module by which an administrator 42 ("admin 42") or some other user may interact with control unit 30. In particular, UI module 38 may present one or more user interfaces by which admin 42 may interact with MEP 40. These user interfaces, when initiated or otherwise used to interact with MEP 40, may be referred to as maintenance sessions. FIG. 2 shows these user interfaces as maintenance sessions 56. Maintenance sessions 56 may also be referred to as "loopback initiator clients" in the context of the loopback protocol described above.

MEP 40 may represent a hardware and/or software module that implements one or more of the CFM suit of protocols, such as the above described Continuity Check Protocol (CCP) and Loopback Protocol (LBP). In the example of FIG. 2, MEP 40 includes both CCP 44A and LBP 44B to facilitate maintenance of the connectivity between various networks, such as customer networks 14. MEP 40 may be substantially similar to MEPs 24, as described above with respect to FIG. 1.

Control plane 32A may also include an operating system 61 ("O/S 61"). Control plane 32A may execute O/S 61 to manage the operation of control unit 30 and particularly the operation of control plane 32A. O/S 61 may comprise a general operating system, such as one of the various Microsoft Corporation operating systems or one of the various Apple Corporation operating system, or a special purpose operating system, such as one of a Juniper Corporation operating system, that is specially defined to handle routing or other network device functionality.

As further shown in FIG. 2, router 28 includes Interface Cards (IFCs) 48A-48N ("IFCs 48") that receive and send packet flows or network traffic via inbound network links 50A-50N ("inbound network links 50") and outbound network links 52A-52N ("outbound network links 52"), respectively. IFCs 48 are typically coupled to network links 50, 52 via a number of interface ports (not shown), and forward and receive packets and control information from control unit 30 via a respective one of paths 54A-54N ("paths 54"). Router 28 may include a chassis (not shown in FIG. 2) having a number of slots for receiving a set of cards, including IFCs 48. Each card may be inserted into a corresponding slot of a chassis for communicably coupling the card to a control unit 30 via a bus, backplane, or other electrical communication mechanism.

Initially, admin 42 may, after powering-up, activating or otherwise enabling router 28 to operate within a network, interact with control unit 30 via UI module 38 to configure MEP 40. Admin 42 may initiate a maintenance session, such as a maintenance session 56A, by which to input configuration information 58 ("config info 58"). Configuration information 58 may include the various parameters and information described above to establish, initiate, or otherwise enable MEP 40 to operate within a given MA. It is assumed for purposes of illustration that router 28 represents, in more detail, CE router 18A of FIG. 1 and that admin 42 configures MEP 40, which may represent MEP 24A, to operate within the MA defined by MEPs 24. Thus, admin 42 may input configuration information 48 via maintenance session 56A to configure MEP 40 in this manner.

Once configured, router 28 may receive network traffic via inbound network links 50. This network traffic may originate from any one of a plurality of customer networks connected to one another via one of the above described services, such as VPLS. Assuming router 28 represents CE router 18A of FIG. 1 in more detail for purposes of illustration, router 28 may receive network traffic from customer network 14A that is destined for either of customer networks 14B, 14C or receive network traffic from customer networks 14B, 14C destined for customer network 14A. IFCs 48 may, upon receiving this network traffic, forward the network traffic to data plane 32B via a respective one of paths 54.

A portion of the received network traffic may however originate not from customer devices within one of customer networks 14, but also from one of CEs 18. This portion of the traffic may be referred to herein as "maintenance traffic." The maintenance traffic may include the above described Continuity Check Messages (CCMs). Upon receiving these CCMs, data plane 32B may generally forward the CCMs to control plane 32A and particularly to MEP 40. CCP 44A of MEP 40 may receive these CCMs and maintain an aging or timeout table or any other data structure by which to note receipt of CCMs from particular other MEPs, such as MEPs 24B, 24C.

In other words, CCP 44A may determine, based on receipt of the CCMs, those of MEPs 24B, 24C to which MEP 40 connects. CCP 44A may then compare this list, table or other data structure of connected MEPs to a list, table or other data structure of expected MEPs. This list of expected MEPs may represent those MEPs configured within the same MA as MEP 40. In this respect, configuration information 58 may include the list, table or other data structure of expected MEPs, and admin 42 may define this list when configuring MEP 40. CCP 44A may compare the list of connected MEPs to the list of expected MEPs to determine which MEPs are not currently connected to MEP 40.

If one or more of the expected MEPs are not listed in the list of connected MEPs, e.g., MEP 24B, CCP 44A may present an error, a warning, or some other alert to admin 42. Typically, CCP 44A interacts with UI module 38 in order to cause UI module 38 to present the alert via a user interface, such as maintenance session 56A. The warning may indicate that an expected one of the MEPs configured to the same MA as MEP 40 has lost connectivity or is no longer connected to MEP 40, e.g., a so-called "connectivity fault."

In response to this connectivity fault, admin 42 may initiate a maintenance session, such as maintenance session 56B, or utilize a currently executing maintenance session, such as maintenance session 56A, in order to resolve the location or origin of the connectivity fault. UI module 38 may, as part of initiating a maintenance session, execute a fork or spawn operation, causing the underlying operating system 61 to create a new software processes and assign a session identifier when creating each of maintenance sessions 56. The operating system 61 on which UI module 38 executes may maintain these session identifiers in session table 60, each as an entry to session table 60. The session identifier (ID) may, as one example, comprise a process ID assigned to both of maintenance sessions 56 by operating system 61 of control unit 30 to differentiate execution of these sessions 56 and for purpose of process scheduling and task switching. Alternatively, the session ID may comprise any handle, number, or other value that uniquely identifies maintenance sessions 56 from one another.

To more efficiently locate and resolve the connectivity fault detected by CCP 44A, admin 42 may utilize both of maintenance sessions 56 to interact with LBP 44B and thereby cause LBP 44B to issue concurrently LBMs to various other endpoints of the MA, e.g., MIPs 26 and MEPs 24B, 24C. To illustrate, admin 42 may interact with maintenance session 56A to define parameters for a first LBM. UI module 38 may pass these user- or admin-specified parameters to LBP 44B by way of an interprocess communication supported by operating system 61. Upon receiving the parameters from the interprocess communication, LBP determines the session ID of maintenance session 56A from which the parameters were received. Such information may be readily available from the interprocess communication delivered to LBP 40 via operating system 61, or LBP 61 may in turn query the operating system to determine the session identifier (e.g., process identifier) for the calling maintenance session 56A. In any event, LBP 44B then constructs a first LBM according to the user-specified parameters. At this time, LBP 44B constructs the first LBM to transparently embed the session ID as part of a TLV field of the message. LBP 44B then forwards the first LBM to data plane 32B, which outputs the first LBM via one of IFCs 48 and a respective one of outbound links 52.

Meanwhile, admin 42 may, after defining the parameters for the first LBM and possibly before router 28 receives a first LBR in response to the first LBM, interact with another maintenance session 56B to enter, input or define parameters for a second LBM. This second set of parameters may differ from the above first set of parameters in that the second set of parameters may define a different endpoint or destination, e.g., different one of MIPs 26 or MEPs 24, from the first set of parameters, even though the endpoints are part of the same MA. Alternatively, the second set of parameters may be substantially similar to the first set of parameters and thereby define a second LBM to the same endpoint as the first LBM.

While described herein with respect to issuing LBMs to endpoints of the same MA, the techniques may be implemented to enable simultaneous execution of two or more maintenance sessions in order to define parameters for LBMs for endpoints of different MAs. In other words, the techniques should not be limited to the exemplary illustration set forth in this disclosure but may enable simultaneous execution of maintenance sessions for generally performing simultaneous maintenance operations on any network association or network generally.

To continue the illustration, UI module 38 may receive the second set of parameters and determine a second session ID that uniquely identifies the maintenance session from which UI module 38 received the second set of parameters, e.g., maintenance session 56B. UI module 38 may perform a lookup in session table 60 in order to determine the second session ID. UI module 38 may forward the second set of parameters along with the second session ID, which is different from the first session ID, to LBP 44B. LBP 44B may receive the second set of parameters and the second session ID and generate a second LBM in accordance with the second set of parameters. LBP 44B may, when generating the second LBM, include the second session ID in a TLV field of the second LBM. LBP 44B may forward this second LBM to data plane 32B, which forwards the second LBM via one of IFCs 48 and a respective one of outbound links 52.

After defining forwarding the first, the second, or both LBMs, data plane 32B may receive via one of IFCs 48 and a respective one of inbound links 50 the first, the second, or both the first and second LBRs in response to the first, the second, or both the first and second LBMs. In some instances, data plane 32B may not receive one or more of the plurality of LBR, as one of the first or second (i.e., plurality) of LBMs may not have reached the endpoint due to the connectivity fault. Assuming however that data plane 32B receives at least one of the first and second LBRs in response to the corresponding one of the LBMs, data plane 32B forwards this received LBR to MEP 40.

According to the CFM loopback protocol as modified herein, the received LBR includes the TLV field specifying the session ID as the techniques described herein take advantage of the fact that the destination endpoint, e.g., one of MIPs 26 or MEPs 24, generates the LBR typically by swapping the destination address of the LBM with the source address of the LBM and forwarding this edited LBM as the LBR. The destination endpoint however typically does not edit or otherwise alter any TLV fields but instead leaves these TLV fields intact, thereby including them in the LBR and, without its knowledge, including the embedded session ID that was originally inserted in the LBM. Thus, LBP 44B may receive LBR and parse the TLV field to extract either the first or second session ID specified by this TLV field. LBP 44B may then forward the LBR and any other information concerning the LBM/LBR exchange, such as a time elapsed between sending the LBM and receiving the corresponding LBR, as well as, to the proper maintenance session 56 of UI module 38 the extracted or parsed session ID. In this way, LBP 44B is able to multiplex received LBRs to the appropriate maintenance sessions 56 based on the embedded session identifiers that were transparently included in outbound LBMs.

UI module 38 receives the LBR and the additional information (which may be referred to as "maintenance information") by way of an interprocess communication from LBP 44B. For example, LBP 44B may establish a Unix pipe or other communication mechanism offered by operating system 61 to each of maintenance sessions 56, and properly selects the correct inter-process communication mechanism based on the parsed session ID. Without this session ID, in other words, LBP 44B may not be able to determine to which of maintenance sessions 56 the LBR and maintenance information corresponds due to limitations of the conventional CFM protocol.

In some cases, maintenance sessions 56 may be maintained internally to UI module 38, in which case UI module 38 acts to properly multiplex incoming LBRs by accessing session table 60 (e.g., via operating system calls to learn process ids) and using the session ID as a lookup to determine to which of maintenance sessions 56 the LBR and maintenance information corresponds. Based on this determination, the UI module 38 forward the LBR and maintenance information to this determined maintenance session 56. In any event, maintenance sessions 56 may then properly present only their own corresponding LBRs and maintenance information to admin 42.

In this manner, the techniques may facilitate simultaneous execution of multiple maintenance sessions 56 by way of associating each of maintenance sessions 56 with a session ID. Using this session ID, a router, such as router 28, may implement the techniques to generate maintenance messages, such as LBMs, that embed these session IDs that uniquely identify the one of maintenance sessions 56 responsible for generating the message. Moreover, router 28 may embed the session IDs in a field of the LBM that is swapped into the LBR when generated by the remote MEP, thus ensuring that the session ID is automatically included in the return message. Upon receiving responses to these maintenance messages, router 28 may parse the responses, e.g., LBRs, to extract the session ID and use this session ID to resolve the one of maintenance sessions 56 to which the received response corresponds.

Without this session ID, the router may not be able to resolve the one of sessions 56 to which the maintenance message corresponds and may inadvertently present maintenance information associated with a first maintenance session via a second maintenance session, which may not only lead to false positives and confuse the administrator, but may result in administrators, such as admin 42, not being able to correctly diagnose and troubleshoot the network, which may lead to the administrator making improper changes to network configurations to correct these misidentified connectivity faults. The techniques therefore may improve the speed and efficiency with which an admin troubleshoots a network while also avoiding false positives and other confusing presentations of maintenance information.

Figure 3:
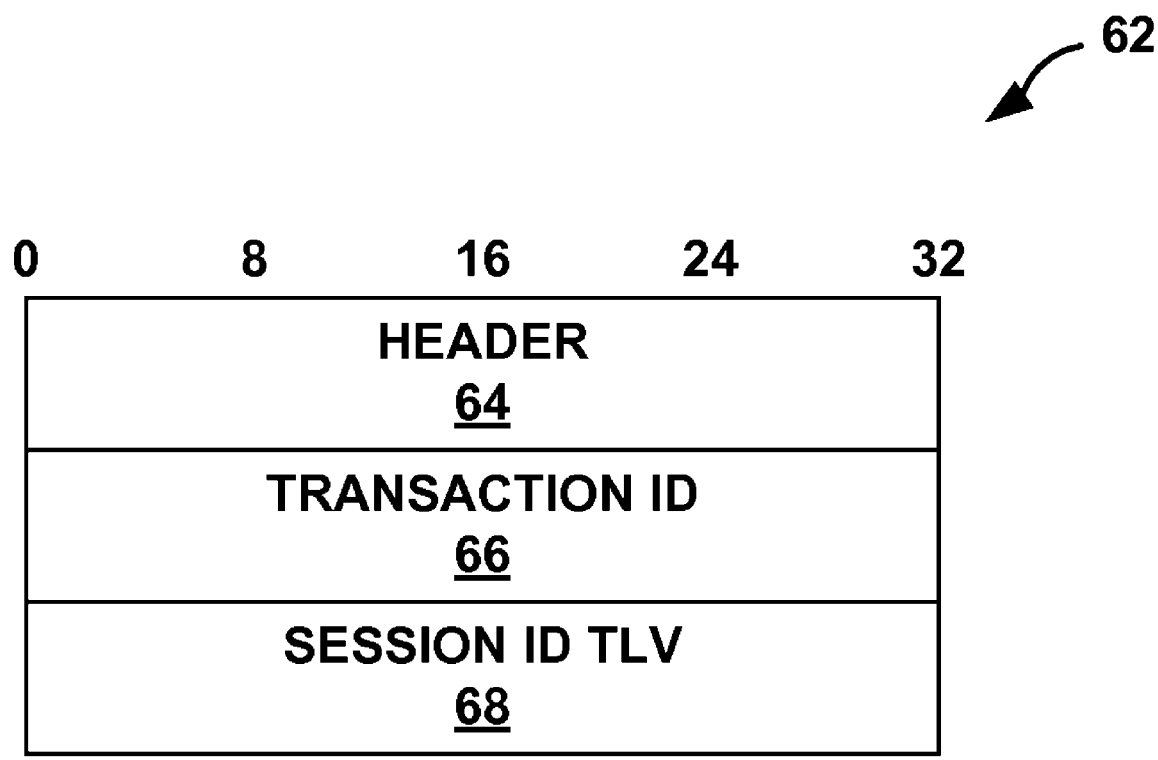
FIG. 3 is a block diagram illustrating an exemplary format of a maintenance message.

FIG. 3 is a block diagram illustrating an exemplary format of a maintenance message 62. Maintenance message 62 may represent either of the above described LBM or LBR in that the format of both the LBM and LBR correspond to the format shown in FIG. 3. As described above, for example, the LBR may be substantially similar to the LBM except that the destination and source addresses specified in the LBM may be swapped in order to generate the LBR. While described with respect to LBMs and LBRs, the techniques may be implemented with respect to any form or type of maintenance message and should not be limited to the form or type of maintenance message described herein.

As shown in FIG. 3, maintenance message 62 includes a header field 64 ("header 64"), a transaction identifier (ID) field 66 ("transaction ID 66") and a session ID type-length-value (TLV) field 68 ("session ID TLV 68"). Each of fields 64-68 may comprise a 4 octet bit field, as shown in FIG. 3 by the numerals "8," "16," "24," and "32" at the top of maintenance message 62 considering that each octet represents 8 bits. Header field 64 may be commonly known as a "common Connectivity Fault Management header" or "common CFM header" when referenced by the above incorporated IEEE 802.1g standard. Header field 64 may include and define a number of parameters, including a Maintenance Domain (MD) level, a version, an OpCode, a plurality of flags, a first TLV offset, additional OpCode related information and an end TLV. An admin, such as admin 42 of FIG. 2, may specify many of these parameters via a maintenance session, such as maintenance session 56A, in order to troubleshoot a detected connectivity fault in the manner described above. Each of these parameters may be stored to a separate sub-field (not shown in FIG. 3) of header field 64.

An MD level sub-field of header field 64 may store an integer identifying the MD level of the packet. The version sub-field of header field 64 may store a protocol version number, which is typically set to 0. The OpCode sub-field of header field 64 may specify the format and meaning of the remainder of the CFM Payload Data Unit (PDU). For example, the OpCode sub-field may store a value of "1" to designate a CCM message, a value of "2" to designate a LBR, or a value of "3" to designate a LBM. The flags sub-fields of header field 64 may be used in different ways depending on the value stored to the OpCode sub-field. The first TLV offset sub-field of header field 64 may store an offset, starting from the first octet following the first TLV offset field, up to the first TLV in the CFM PDU. This first TLV offset sub-field may therefore indicate the distance from the end of the common CFM header to the first TLV field of the CFM PDU, e.g., session ID TLV field 68 in the example of FIG. 3.

Loopback transaction ID or simply transaction ID field 66 may store an integer or other number that uniquely identifies the loopback message in a stream of loopback message and responses. Session ID TLV field 68 may include a type sub-field, a length sub-field and one or more value sub-fields, hence the name type-length-value field 68. The type sub-field may store an integer or other number or handle indicating the type of the TLV field 68 as storing a session ID that uniquely identifies a maintenance session by which admin 42 initiated maintenance message 62.

The length sub-field of TLV field 68 may store an integer length setting out a length or size of the value sub-field of TLV field 68. The value sub-field of TLV field 68 specifies, in accordance with the techniques described herein, the session ID assigned to the maintenance session by which admin 42 initiated maintenance message 62. As described above, the session ID may comprise a process ID assigned to the corresponding maintenance session by control unit 30 or any other handle that uniquely identifies maintenance sessions from one another. By specifying session ID TLV field 68 in this manner to define a session ID associated with a particular maintenance session, a network device, such as router 28, may simultaneously execute multiple maintenance sessions and resolve to which maintenance session a given maintenance message, such as maintenance message 62, corresponds.

Figure 4:
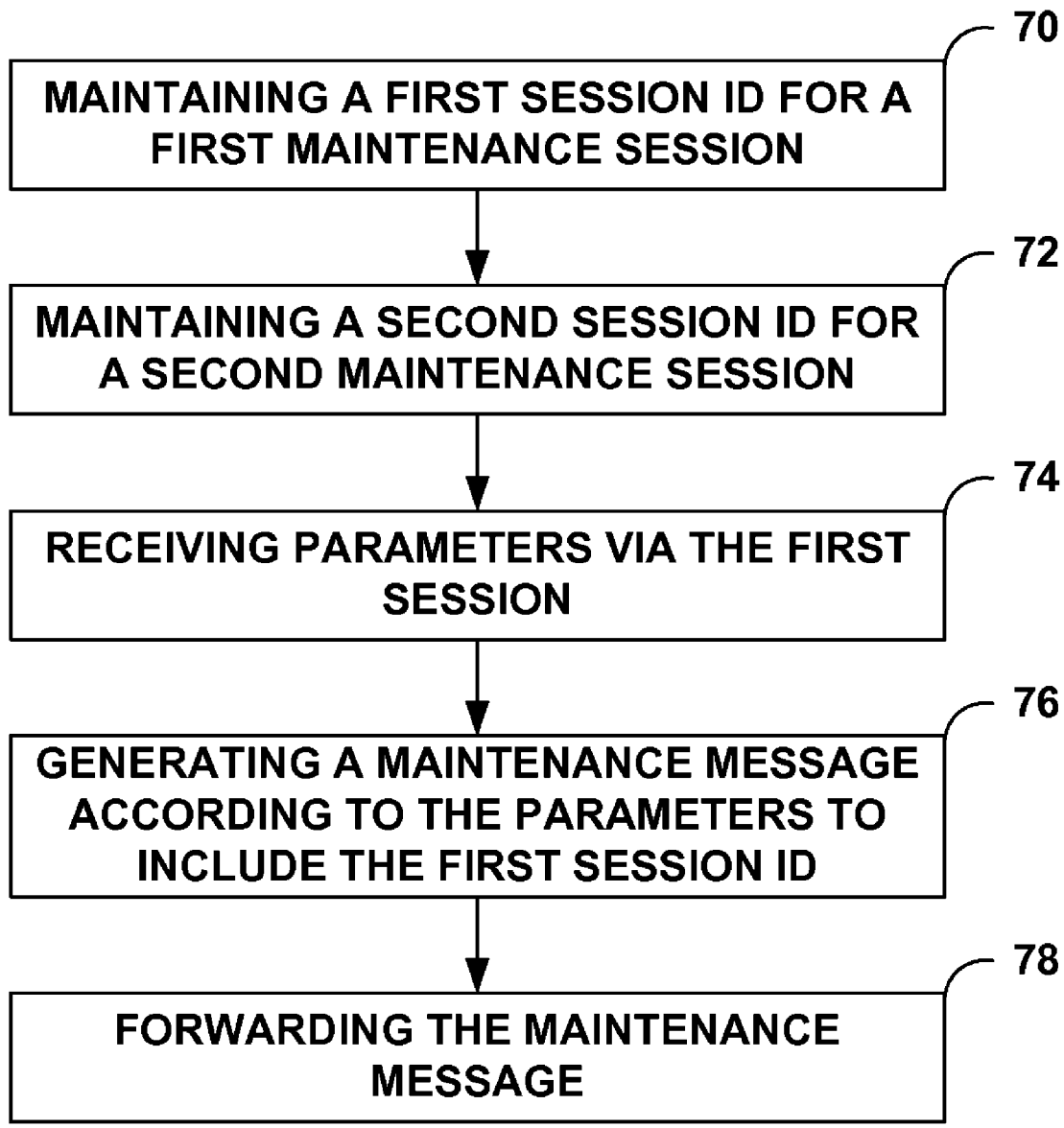
FIG. 4 is a flowchart illustrating exemplary operation of a network device in generally performing the techniques described herein.

FIG. 4 is a flowchart illustrating exemplary operation of a network device in generally performing the techniques described herein. While described below with respect to router 28 of FIG. 2, the techniques may be implemented by any network device, including an Ethernet or other network bridge device.

Generally, router 28 may maintain a first session ID for a first maintenance session in that control unit 30 may maintain a session table 60 that stores a first session ID that uniquely identifies a first maintenance session, such as maintenance session 56A (70). Control unit 30 may also maintain within session table 60 a second session ID for a second maintenance session, such as maintenance session 56B, where the second session ID uniquely identifies the second maintenance session (72).

In particular, operating system 61 may update session table 60 upon initiating execution of (e.g., launching or spawning) or otherwise enabling each of maintenance sessions 56 to include session ID associated with each of maintenance sessions 56. Likewise, operating system 61 may update session table 60 to remove these session IDs associated with each of maintenance sessions 56 upon ending execution of or otherwise disabling each of maintenance sessions 56. In this respect UI module 38 may maintain session IDs for both of maintenance sessions 56.

As described above, an administrator, such as admin 42, or some other user may interact with one of maintenance sessions 56, such as first maintenance session 56A, to input or define parameters by which to generate a maintenance message, such as those parameters described above with respect to maintenance message 62 of FIG. 3, and UI module 38 may receive these parameters (74). UI module 38 may forward these parameters to MEP 40 via, for example, an inter-process communication of operating system 61, from which MEP 40 may determine a first session ID that uniquely identifies maintenance session 56A as the session that received the parameters. Alternatively, UI module 38 may pass the session ID or other unique identifier to MEP 40. MEP 40, generally, and LBP 44B, particularly, may receive the parameters and session ID and generate a maintenance message according to the received parameters and which includes the first session ID (76). This maintenance message may correspond to the format identified above with respect to maintenance message 62.

After generating this maintenance message, LBP 44B may forward this maintenance message to its intended destination via data plane 32B, one of IFCs 48, and a corresponding one of outbound links 52 (78). By including this first session ID within the generated maintenance message, router 28 may upon receiving a response to this maintenance message determine to which of maintenance sessions 56 the maintenance message corresponds. The techniques therefore may enable simultaneous execution of maintenance session.

Figure 5A:
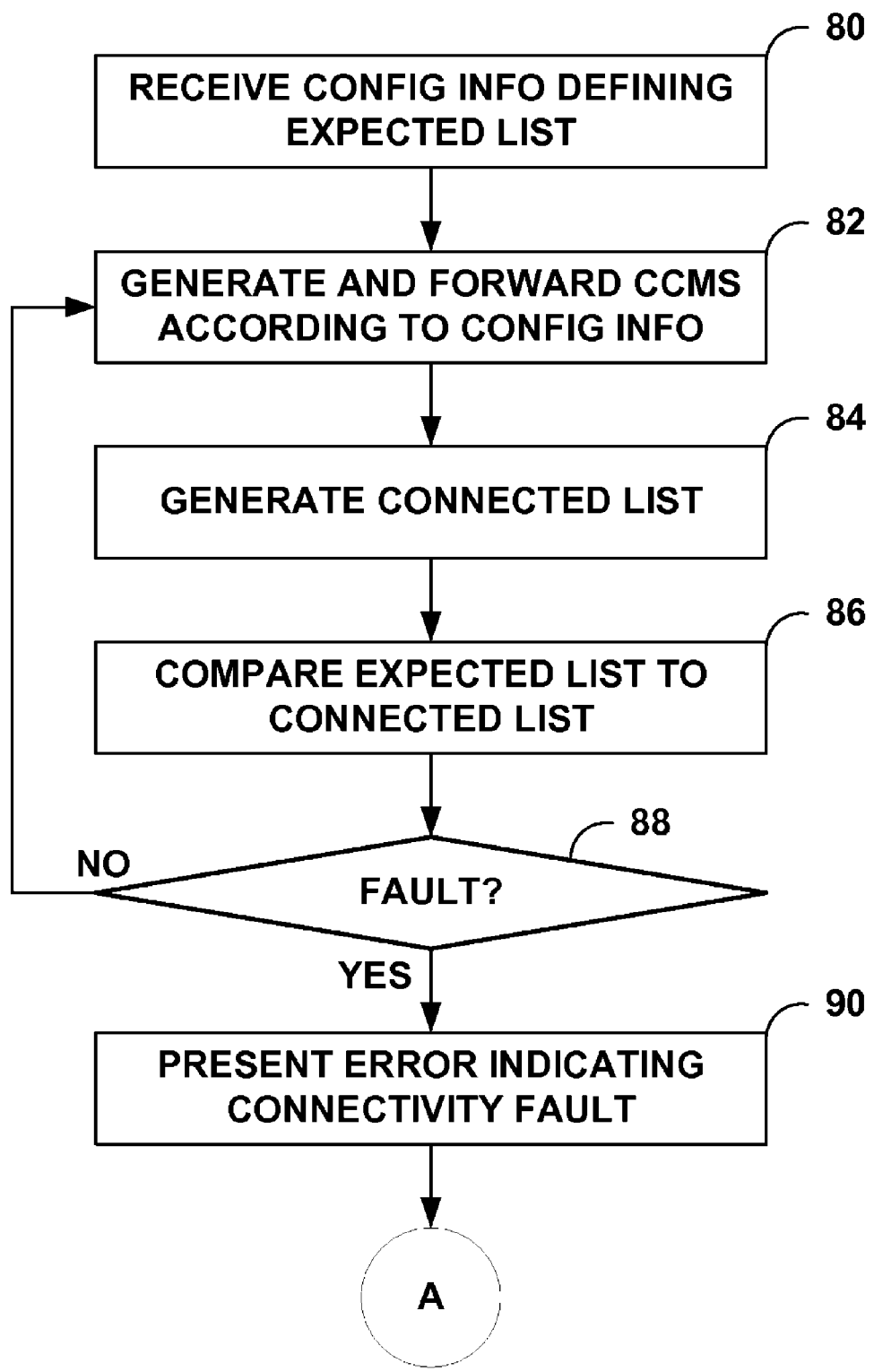
FIGS. 5A and 5B are flowcharts illustrating in more detail exemplary operation of a network device in performing the techniques within the context of CFM protocols.
Figure 5B:
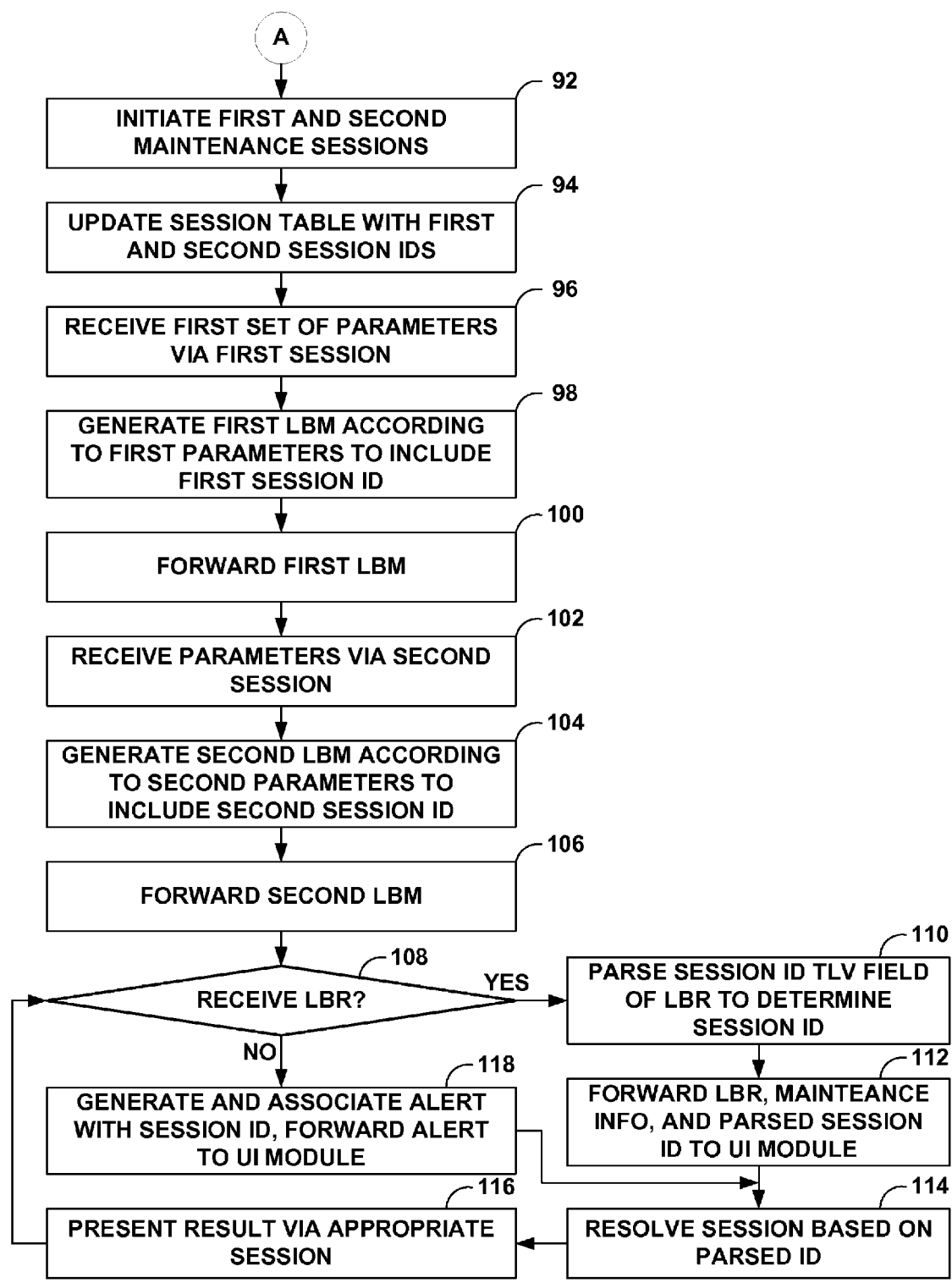

FIGS. 5A and 5B are flowcharts illustrating in more detail exemplary operation of a network device, such as router 28 of FIG. 2, in performing the techniques within the context of CFM protocols. While described with respect to both a particular network device, i.e., a router, that implements particular CFM protocols, CCP 44A and LBP 44B, the techniques as suggested above may be implemented by any network device, including a bridge device, that provides any maintenance functions.

Initially, as shown in FIG. 5A, control unit 30 of router 28 may receive configuration information 58 that defines a list or other data structure of expected endpoints in a given Maintenance Association (80). Control unit 30 may receive this information via a user interface, such as one of maintenance sessions 56, presented by UI module 38. UI module 38 may therefore receive configuration information 58, whereupon control unit 30 may configure MEP 40 according to configuration information 58, as described above. Once configured, MEP 40 and, more particularly, CCP 44A of MEP 40 may generate and forward CCMs in accordance with configuration information 58 (82). In other words, CCP 44A may generate and forward a CCM to those endpoints, e.g., MEPs 24 of FIG. 1, included within the same MA as MEP 40. Again, the CCM may comprise a multicast message, and CCP 44A may forward or, better stated, multicast this CCM message to those endpoint included within the same MA as MEP 40. These endpoints may be identified by the expected list of connected endpoints and thus, CCP 44A may generate and forward in this manner a single CCM, which is then replicated to each of the endpoints included within the expected list, which may indicate each endpoint that "joined" the multicast group.

After forwarding the CCM, MEP 40 may wait to receive similar CCMs from each of the other endpoints included within the expected list. MEP 40 may receive these similar CCMs simultaneous to the forwarding of the CCMs or may receive these similar CCMs before forwarding of the CCMs. In other words, while suggested above that MEP 40 waits to receive similar CCMs only after forwarding the CCMs MEP 40 generated, the transmission and receipt of CCMs occurs independent of one another and transmission of a CCM does not trigger or otherwise cause the receiving MEP to respond to the transmitted CCM. Rather, a CCM is an independent message used to independently evaluate connectivity between two or more endpoints.

Upon receiving these other CCMs, MEP 40 may maintain a list or other data structure noting receipt of these other CCMs, which may represent a list of currently connected endpoints. In this manner, MEP 40 may generate a currently connected list of endpoints in accordance with CCP 44A (84). CCP 44A may then, as described above, compare the expected list defined by configuration information 58 to the currently connected list of endpoints to determine whether a connectivity fault has occurred (86).

If each endpoint of the expected list is included within the currently connected list, CCP 44A may determine that no connectivity fault has occurred and proceeds to generate and forward, often after a configured or set amount of time, CCMs in accordance with configuration information 58 to once again check for a connectivity fault ("NO" 88, 82-86). Again, the transmission and receipt of CCMs, in various aspects, occurs independent of one another. If, however, a connectivity fault is detected, e.g., one or more of the endpoints included within the expected list of endpoints is not included within the currently connected list of endpoints, CCP 44A may detect a connectivity fault and present this fault via a user interface to an administrator, such as admin 42, or some other user ("YES" 88, 90). CCP 44A may, for example, forward an error, warning or alert indicating this fault to UI module 38, which may present the error, warning or alert via one of maintenance sessions 56.

As shown in FIG. 5B, admin 42, in response to this error, may initiate first and second maintenance sessions 56, if not previously initiated, or may initiate an additional maintenance session 56B if first maintenance session 56A is already executing (92). Regardless, control unit 30 may simultaneously execute and UI module 38 may simultaneously present (although, as is common, one of maintenance sessions 56 may overlay the other one of maintenance sessions 56) both of maintenance sessions 56 to admin 42. UI module 38 may, when initiating maintenance sessions 56, update session table 60 to associate respective first and second session IDs to each of maintenance sessions 56, as described above (94).

After initiating or otherwise enabling maintenance sessions 56, UI module 38 may receive a first set of parameters via first maintenance session 56A (96). These parameters may define one or more values for the above described sub-fields of header field 64 described with respect to maintenance message 62 of FIG. 3. UI module 38 may forward the first set of parameters along with the first session ID to LBP 44B of MEP 40. LBP 44B may generate a first LBM according to the first set of parameters and include within the first LBM a session ID TLV field, such as session ID TLV field 68 of FIG. 3, that stores the first session ID (98). LBP 44B may then forward this first maintenance message or LBM in the manner described above (100).

Meanwhile, admin 42 may, after inputting the first set of parameters or even while inputting the first set of parameters, input a second set of parameters via second maintenance session 56B that, like the first set of parameters, define one or more values for the above described sub-fields of header field 64. UI module 38 may receive this second set of parameters via second maintenance session 56B (102). UI module 38 may forward the second set of parameters along with the second session ID to LBP 44B of MEP 40. LBP 44B may generate a second LBM according to the second set of parameters and include within the second LBM a session ID TLV field, such as session ID TLV field 68, that stores the second session ID (104). LBP 44B may then forward this second maintenance message or LBM in the manner described above (106). LBP 44B may then wait for a LBR in response to each of the first and second LBMs (108).

Upon receiving an LBR ("YES" 108), LBP 44B may parse the session ID TLV field included within the LBR to determine a session ID stored to this field, as described above (110). After parsing the session ID, LBP 44B may determine to which of maintenance sessions 56 the LBR corresponds based on the parsed session ID. In this manner, LBP 44B may resolve to which one of maintenance sessions 56 the received LBR corresponds (112). Next, LBP 44B may forward via the above described interprocess communication the received LBR and the above described maintenance information to the resolved one of maintenance session 56 of UI module 38 (114). UI module 38 may then present the result, which in this instance comprises the received LBR and the corresponding maintenance information, via the appropriate one of maintenance sessions 56 identified by the parsed session ID (116).

If a LBR is not received in response to either the first or second LBM after a configured or set amount of time ("NO" 108), LBP 44B may update UI module 38 with this occurrence by forwarding a warning, update, error or alert to a one of maintenance sessions 56 of UI module 38 identified by the session ID included within the session ID TLV field of the LBM to which a response has not yet been received. That is, LBP 44B may resolve, again, to which of maintenance sessions 56 of UI module 58 the error corresponds and forward this error to the resolved one of maintenance sessions 56 (118, 114). As described above, UI module 38 may then present the result, which in this instance is an alert, via the appropriate one of maintenance sessions 56 (116).

In this manner, a network device, such as router 28, may implement the techniques to simultaneously transmit or forward LBMs, or more generally requests, to remote endpoints, e.g., MEPs or MIPs, belonging to the same MA. As a result, an admin may troubleshoot connectivity to different endpoints from different maintenance sessions, e.g., CLIs and/or GUIs. Furthermore, by simultaneously enabling two or more sessions, administrators may have more flexibility in troubleshooting connectivity faults or other maintenance errors.

While described above with respect to operations or steps occurring in a particular order, the techniques should not be limited to the exemplary order set forth in the flowcharts of FIGS. 4, 5A and 5B above. In other words, the techniques may be implemented in any order so long as the techniques enable simultaneous execution of multiple maintenance sessions. For example, either one of or both of maintenance sessions 56 may be initiated by admin 42 at any time and each of maintenance sessions 56 may receive input regarding either the first or second sets of parameters in any order. Moreover, maintenance sessions 56 may interact with LBP 44B in any order and may receive LBRs in any order.

Also as described above, the techniques refer to simultaneous execution of maintenance sessions 56, but simultaneous should not be construed to require the same start and end execution times. Rather, simultaneous refers to overlapping execution of maintenance sessions 56. Various embodiments of the invention have been described. These and other embodiments are within the scope of the following claims.

The invention claimed is:

1. A method comprising:
   simultaneously executing, with a first network device, a first maintenance session and a second maintenance session different from the first maintenance session for a same maintenance association, wherein the maintenance association comprises a logical grouping of at least the first network device and a second network device that are established to verify the integrity of a single service instance;
   maintaining a first session identifier that uniquely identifies the first maintenance session within the first network device and a second session identifier that uniquely identifies the second maintenance session within the first network device;
   generating, with the first network device, an outgoing maintenance message such that the outgoing maintenance message includes a session identifier field specifying the first session identifier when the outgoing maintenance message is associated with the first maintenance session and specifying the second session identifier when the outgoing maintenance message is associated with the second maintenance session, wherein the outgoing maintenance message conforms to a maintenance protocol that does not specify session identifiers for inclusion in the outgoing maintenance message;
   transmitting, with the first network device, the outgoing maintenance message to a second network device included within the maintenance association;
   receiving, with the first network device, a response maintenance message from the second network device in response to the outgoing maintenance message, wherein the response maintenance message includes the same session identifier field, unmodified by the second network device, specifying either the first or the second session identifier;
   parsing, with the first network device, the response maintenance message to determine whether the session identifier field stores either the first or the second session identifier; and
   forwarding, with the first network device, the response maintenance message to the first or the second maintenance session based on the determination.

2. The method of claim 1, further comprising:
   receiving, with the first maintenance session, input that specifies parameters by which to generate the outgoing maintenance message,
   wherein generating the outgoing maintenance message comprises generating the outgoing maintenance message in accordance with the parameters such that the maintenance message includes the first session identifier, and
   wherein forwarding the outgoing maintenance message includes forwarding the outgoing maintenance message to the second network device in order to determine connectivity between the first and second network devices.

3. The method of claim 2, further comprising:
   generating, with the first network device, maintenance information concerning receipt of the maintenance message, wherein parsing, with the first network device, the response maintenance message includes parsing the response maintenance message to determine the first session identifier; and
   determining, with the first network device, that the response maintenance message and the maintenance information correspond to the first maintenance session based on the first session identifier parsed from the response maintenance message,
   wherein forwarding the maintenance message comprises forwarding one or more of the response maintenance message and the maintenance information to the first maintenance session based on the determination.

4. The method of claim 2,
   wherein receiving the input comprises receiving, with the first maintenance session, the input that specifies a first set of parameters by which to generate a first outgoing maintenance message,
   wherein generating the maintenance message comprises generating the first outgoing maintenance message in accordance with the first set of parameters such that the first outgoing maintenance message includes the first session identifier, and
   wherein the method further comprises:
   receiving, with the second maintenance session, additional input that specifies a second set of parameters by which to generate a second outgoing maintenance message;
   generating, with the first network device, the second outgoing maintenance message in accordance with the second set of parameters such that the second outgoing maintenance message includes the second session identifier; and
   forwarding, with the first network device, the second outgoing maintenance message to either the second network device or a third network device in order to determine connectivity between the first and either the second or the third network device.

5. The method of claim 4, further comprising:
   receiving, with the first network device, another response maintenance message in response to either the first or the second outgoing maintenance message that includes either the first or the second session identifier;
   generating, with the first network device, additional maintenance information concerning receipt of the other maintenance message;
   parsing, with the first network device, the other response maintenance message to determine whether the other maintenance message includes either the first or the second session identifier;
   forwarding one or more of the other response maintenance message and the additional maintenance information to the first maintenance session based on a determination that the other response maintenance message includes the first session identifier; and forwarding one or more of the other response maintenance message and the maintenance information to the second maintenance session based on a determination that the other response maintenance message includes the second session identifier.

6. The method of claim 2,
wherein receiving input that specifies the parameters comprises receiving, from a user, input that specifies the parameters defined by a loopback protocol, and
wherein the parameters include one or more of a Maintenance Domain (MD) level, a version, an OpCode, a plurality of flags, a first Type-Length Value (TLV) offset, additional OpCode related information and an end TLV.

7. The method of claim 2,
wherein generating the outgoing maintenance message comprises generating a LoopBack Message (LBM) in accordance with a LoopBack Protocol (LBP), wherein the LBM includes a header that stores one or more of the parameters and a session identifier (ID) Type-Length-Value (TLV) field that stores the first session identifier, and
wherein forwarding the outgoing maintenance message comprises forwarding the LBM to the second network device in order to determine the connectivity between the first and second network device.

8. The method of claim 7,
wherein receiving the response maintenance message comprises receiving, in response to the LBM, a LoopBack Response message (LBR) that transparently includes the first session identifier, and
the method further comprising generating, with the first network device, maintenance information concerning receipt of the LBR,
wherein parsing the maintenance message includes parsing the LBR to determine the first session identifier; and
determining, with the first network device, that the LBR and the maintenance information correspond to the first maintenance session based on the first session identifier parsed from the LBR,
wherein forwarding the response maintenance message include forwarding one or more of the LBR and the maintenance information to the first maintenance session based on the determination.

9. The method of claim 7, further comprising:
receiving, with the first network device, configuration information that configures a maintenance endpoint to execute within the first network device, wherein the maintenance endpoint implements both a Continuity Check Protocol (CCP) and a LoopBack Protocol (LBP) and wherein the configuration information defines a list of at least one expected maintenance endpoint that belongs to the same maintenance association as that of the configured maintenance endpoint executing within the network device
generating, prior to generating the LBM, at least one Continuity Check Message (CCM);
forwarding, prior to generating the LBM, the at least one CCM to each of the at least one expected maintenance endpoints of the list;
receiving, with the first network device, at least one other CCM from the at least one expected maintenance endpoint of the list;
generating, with the first network device, another list indicating those of the at least one expected maintenance endpoints that are currently connected to the maintenance endpoint of the first network device based on the receipt of the at least one other CCM;
comparing the list of expected maintenance endpoints to the other list of currently connected maintenance endpoints to determine a connectivity fault; and
presenting the connectivity fault to a user prior to generating the LBM.

10. The method of claim 1,
wherein each of the first session and the second session are different software processes executed by an operating system of a control unit within the network devices, and
wherein maintaining the first session identifier and the second session identifier comprises maintaining the first session identifier and the second session identifiers as a first process identifier and a second process identifier assigned respectively by the operating system of the first network device to the first and second maintenance sessions.

11. The method of claim 1, wherein the first and second network devices each comprises one of a router or a bridge device.

12. The method of claim 1, further comprising presenting the maintenance message with either the first or the second maintenance session to a user.

13. A network device comprising:
a control unit that simultaneously executes a first maintenance session and a second maintenance session different from the first maintenance session for a same maintenance association, wherein the maintenance association comprises a logical grouping of at least the network device and another network device that are established to verify the integrity of a single service instance, maintains a first session identifier that uniquely identifies the first maintenance session within the first network device and a second session identifier that uniquely identifies the second maintenance session within the first network device and generates an outgoing maintenance message such that the outgoing maintenance message includes a session identifier field specifying the first session identifier when the outgoing maintenance message is associated with the first maintenance session and specifying the second session identifier when the outgoing maintenance message is associated with the second maintenance session, wherein the outgoing maintenance message conforms to a maintenance protocol that does not specify session identifiers for inclusion in the outgoing maintenance message; and
at least one interface card that transmits the outgoing maintenance message to the other network device included within the maintenance association and receives a response maintenance message from the other network device in response to the outgoing maintenance message, wherein the response maintenance message includes the same session identifier field, unmodified by the other network device, specifying either the first or the second session identifier,
wherein the control unit parses the response maintenance message to determine whether the session identifier field stores either the first or the second session identifier and forwards the response maintenance message to the first or the second maintenance session based on the determination.

14. The network device of claim 13,
wherein the control unit comprises a user interface module that presents the first and second maintenance sessions,
wherein the user interface module receives, with the first maintenance session, input that specifies parameters by which to generate the outgoing maintenance message,
wherein the control unit further comprises a maintenance endpoint (MEP) that generates the outgoing maintenance message in accordance with the parameters such that the maintenance message includes the first session identifier, and
wherein the at least one interface card forwards the outgoing maintenance message to the other network device in order to determine connectivity between the network devices.

15. The network device of claim 14, wherein the MEP further generates maintenance information concerning receipt of the maintenance message, parses the response maintenance message to determine the first session identifier, determines that the response maintenance message and the maintenance information correspond to the first maintenance session based on the first session identifier parsed from the response maintenance message, and forwards one or more of the response maintenance message and the maintenance information to the first maintenance session based on the determination.

16. The network device of claim 14,
wherein the user interface module receives via the first maintenance session the input that specifies a first set of parameters by which to generate a first outgoing maintenance message,
wherein the MEP generates the first outgoing maintenance message in accordance with the first set of parameters such that the first outgoing maintenance message includes the first session identifier,
wherein the user interface module further receives via the second maintenance session additional input that specifies a second set of parameters by which to generate a second outgoing maintenance message,
wherein the MEP further generates the second outgoing maintenance message in accordance with the second set of parameters such that the second outgoing maintenance message includes the second session identifier, and
wherein the at least one interface card forwards the second outgoing maintenance message to either the other network device or a third network device in order to determine connectivity between the network device and either the other or the third network device.

17. The network device of claim 16,
wherein the at least one interface card receives another response maintenance message in response to either the first or the second outgoing maintenance message that includes either the first or the second session identifier,
wherein the MEP generates additional maintenance information concerning receipt of the other maintenance message, parses the other response maintenance message to determine whether the other maintenance message includes either the first or the second session identifier, forwards one or more of the other response maintenance message and the additional maintenance information to the first maintenance session based on a determination that the other response maintenance message includes the first session identifier, and forwards one or more of the other response maintenance message and the maintenance information to the second maintenance session based on a determination that the other response maintenance message includes the second session identifier.

18. The network device of claim 14,
wherein the user interface module receives, from a user, input that specifies the parameters defined by a loopback protocol, and
wherein the parameters include one or more of a Maintenance Domain (MD) level, a version, an OpCode, a plurality of flags, a first Type-Length Value (TLV) offset, additional OpCode related information and an end TLV.

19. The network device of claim 14,
wherein the MEP includes a LoopBack Protocol (LBP) module that generates a LoopBack Message (LBM) in accordance with a LoopBack Protocol (LBP), wherein the LBM includes a header that stores one or more of the parameters and a session identifier (ID) Type-Length-Value (TLV) field that stores the first session identifier, and
wherein the at least one interface card forwards the LBM to the other network device in order to determine the connectivity between the network device and the other network device.

20. The network device of claim 19,
wherein the at least one interface card receives, in response to the LBM, a LoopBack Response message (LBR) that transparently includes the first session identifier, and
wherein the LBP generates maintenance information concerning receipt of the LBR, parses the LBR to determine the first session identifier, determines that the LBR and the maintenance information correspond to the first maintenance session based on the first session identifier parsed from the LBR, and forwards one or more of the LBR and the maintenance information to the first maintenance session based on the determination.

21. The network device of claim 19,
wherein the user interface module receives configuration information that configures the MEP to execute within the network device,
wherein the MEP includes both a Continuity Check Protocol (CCP) module and a LoobBack Protocol (LBP) module,
wherein the configuration information defines a list of at least one expected maintenance endpoint that belongs to the same maintenance association as that of the configured maintenance endpoint executing within the network device,
wherein the CCP module generates, prior to the LBP module generating the LBM, at least one Continuity Check Message (CCM),
wherein the at least one interface card forwards, prior to the LBP module generating the LBM, the at least one CCM to each of the at least one expected maintenance endpoints of the list and receives at least one other CCM from the at least one expected maintenance endpoint of the list,
wherein the CCP module generates another list indicating those of the at least one expected maintenance endpoints that are currently connected to the maintenance endpoint of the network device based on the receipt of the at least one other CCM, compares the list of expected maintenance endpoints to the other list of currently connected maintenance endpoints to determine a connectivity fault and generates the connectivity fault prior to generating the LBM based on the determination.

22. The network device of claim 13,
wherein the control unit further executes an operating system,
wherein each of the first session and the second session are different software processes executed by the operating system,
wherein the first session identifier and the second session identifier comprise a first process identifier and a second process identifier respectively, and
wherein the operating system assigns the first process identifier and the second process identifier to the first and second maintenance sessions, respectively.

23. The network device of claim 13, wherein the network device and the other network device each comprises one of a router or a bridge device.

24. The network device of claim 13, wherein the control unit includes a user interface module that presents the maintenance message with either the first or the second maintenance session to a user.

25. A network system comprising:
a first network that includes a first network device; and
a second network that includes a second network device,
wherein the first network device and the second network device logically belong to a maintenance association that enables the first network device to troubleshoot connectivity between the first network device and the second network device that belong to the same maintenance association,
wherein the first network device includes:
a first control unit that simultaneously executes a first maintenance session and a second maintenance session different from the first maintenance session for the same maintenance association, maintains a first session identifier that uniquely identifies the first maintenance session within the first network device and a second session identifier that uniquely identifies the second maintenance session within the first network device and generates an outgoing maintenance message such that the outgoing maintenance message includes a session identifier field specifying the first session identifier when the outgoing maintenance message is associated with the first maintenance session and specifying the second session identifier when the outgoing maintenance message is associated with the second maintenance session, wherein the outgoing maintenance message conforms to a maintenance protocol that does not specify session identifiers for inclusion in the outgoing maintenance message; and
a first interface card that transmits the outgoing maintenance message to the second network device included within the maintenance association,
wherein the second network device includes:
a second interface card that receives the outgoing maintenance message from the first network device, wherein the outgoing message includes a destination address identifying the second network device and a source address identifying the first network device; and
a second control unit that generates a response maintenance message to the outgoing maintenance message by swapping the destination address with the source address and changing an opcode to indicate a type of the message as a response message without further modifying the outgoing maintenance message,
wherein the second interface card forwards the response maintenance message to the first network device,
wherein the first interface card receives the response maintenance message from the second network device,
wherein the response maintenance message includes the same session identifier field, unmodified by the second network device, specifying either the first or the second session identifier, and
wherein the first control unit parses the response maintenance message to determine whether the session identifier field stores either the first or the second session identifier and forwards the response maintenance message to the first or the second maintenance session based on the determination.

26. The network system of claim 25,
wherein the first network comprises a customer network,
wherein the first network device comprises a customer edge (CE) network device,
wherein the second network comprises a service provider network, and
wherein the second network device comprises a provider edge (PE) network device.

27. The network system of claim 25,
wherein the first network comprises a first customer network,
wherein the first network device comprises a first customer edge (CE) network device,
wherein the second network comprises a second customer network, and
wherein the second network device comprises a second customer edge (CE) network device.

28. The network system of claim 27, further comprising a service provider network that includes one or more provider edge (PE) network devices, wherein the service provider network interconnects the first and second customer networks via a service, wherein the service comprises one of a virtual private large area network (LAN) service (VPLS) or a virtual private network (VPN) service.

29. A non-transitory computer-readable storage medium comprising instructions that cause a programmable processor to:
simultaneously execute, with a first network device, a first maintenance session and a second maintenance session different from the first maintenance session for a same maintenance association, wherein the maintenance association comprises a logical grouping of at least the first network device and a second network device that are established to verify the integrity of a single service instance;
maintain a first session identifier that uniquely identifies the first maintenance session within the first network device and a second session identifier that uniquely identifies the second maintenance session within the first network device;
generate, with the first network device, an outgoing maintenance message such that the outgoing maintenance message includes a session identifier field specifying the first session identifier when the outgoing maintenance message is associated with the first maintenance session and specifying the second session identifier when the outgoing maintenance message is associated with the second maintenance session, wherein the outgoing maintenance message conforms to a maintenance protocol that does not specify session identifiers for inclusion in the outgoing maintenance message;

transmit, with the first network device, the outgoing maintenance message to a second network device included within the maintenance association;

receive, with the first network device, a response maintenance message from the second network device in response to the outgoing maintenance message, wherein the response maintenance message includes the same session identifier field, unmodified by the second network device, specifying either the first or the second session identifier;

parse, with the first network device, the response maintenance message to determine whether the session identifier field stores either the first or the second session identifier; and forward, with the first network device, the response maintenance message to the first or the second maintenance session based on the determination.

* * * * *